United States Patent [19]

Smith et al.

[11] 4,032,319
[45] June 28, 1977

[54] COMPOSITE FERTILIZER AND METHOD FOR ITS MANUFACTURE

[75] Inventors: Jack Lee Smith; Charles Raymond Crowley; Roger Benton Humberger, all of Pocatello, Idaho

[73] Assignee: J. R. Simplot Company, Boise, Idaho

[22] Filed: Oct. 24, 1975

[21] Appl. No.: 625,723

Related U.S. Application Data

[63] Continuation-in-part of Ser. No. 371,439, June 19, 1973, abandoned.

[52] U.S. Cl. .................................. 71/34; 71/31; 71/64 F; 71/64 A
[51] Int. Cl.² .................................. C05B 7/00
[58] Field of Search ................ 71/1, 31, 27, 28–30, 71/64 E, 64 F, 34, 36

[56] References Cited

UNITED STATES PATENTS

| | | | |
|---|---|---|---|
| 3,295,950 | 1/1967 | Blouin et al. | 71/64 F |
| 3,306,730 | 2/1967 | Malmberg et al. | 71/64 F |

*Primary Examiner*—Thomas G. Wyse
*Assistant Examiner*—Ferris H. Lander
*Attorney, Agent, or Firm*—Jones, Tullar & Cooper

[57] ABSTRACT

This invention relates to novel fertilizer particles having an inner core and an outer water permeable sulfur coating; to a method of preparing these fertilizer particles by contacting a particulate core material in a fluidized bed, or other suitable coating apparatus, with molten sulfur which solidifies upon the core material; the process preferably being conducted in a fluidized bed having an inert atmosphere in the material contacting zone. This invention is particularly useful in preparing triple superphosphate fertilizers with a water permeable coating of elemental sulfur.

10 Claims, 1 Drawing Figure

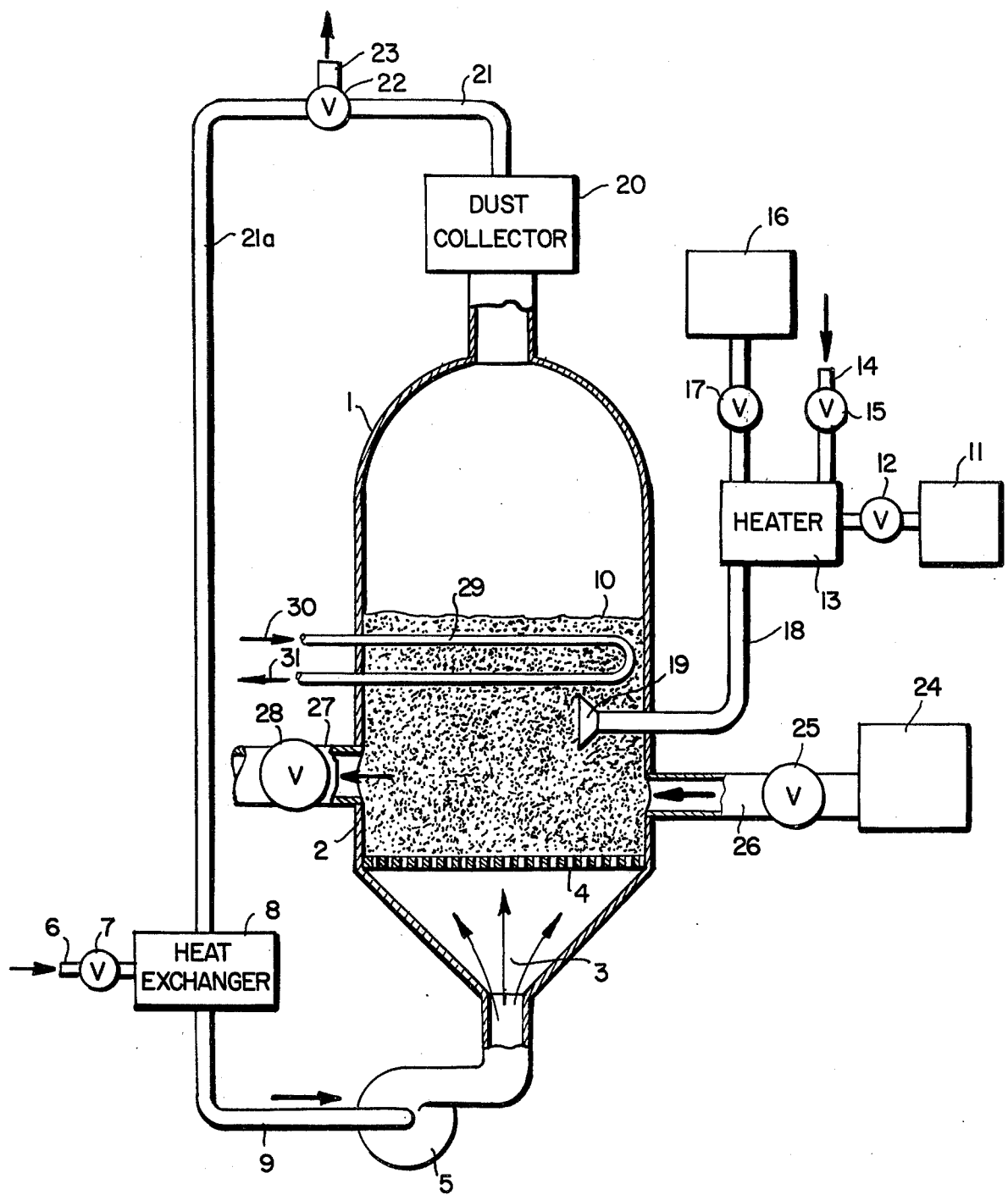

COMPOSITE FERTILIZER AND METHOD FOR ITS MANUFACTURE

CROSS REFERENCE TO RELATED APPLICATION

This application is a continuation-in-part of copending application Ser. No. 371,439, filed June 19, 1973, and now abandoned.

STATE OF THE ART

Numerous compositions and processes are known in the fertilizer art to incorporate various nutrients into a base composition to render it a balanced fertilizer for a specific purpose. One such nutrient is sulfur. For example, U.S. Pat. No. 1,777,908 discloses placing phosphate into a rotating drum into which vaporous sulfur is introduced. In U.S. Pat. No. 3,666,523 a curtain of phosphate fertilizer is contacted with sulfur containing materials and other nutrients.

Fluidized beds have previously been employed in the fertilizer art. For example, in U.S. Pat. No. 3,136,603, particles are coated with an ammonia-phosphoric acid reaction product.

The use of a fluidized bed to form mixed fertilizers from solutions is taught in U.S. Pat. No. 2,536,818, while the use of fluidized beds to produce homogeneous fertilizers from solutions is taught by the following U.S. Pat. Nos. 3,231,413; 3,475,132; 3,533,829; and 3,607,214.

Further, prilling of sulfur by the use of a fluidized bed is taught in British Pat. No. 1,225,116 and as well as U.S. Pat. No. 3,231,413.

U.S. Pat. No. 3,295,950 teaches the uniform coating of certain fertilizers with sulfur which can contain insoluble metal salts as micronutrients.

DESCRIPTION OF THE INVENTION

This invention relates to novel composite fertilizers with calcium or ammonium phosphate fertilizer particles forming an inner core with an outer coating of sulfur and to a method of preparing these fertilizer particles which comprises contacting the particulate core material in a fluidized bed, or other suitable coating means with molten sulfur which solidifies about the core material. Preferably, the process is conducted in a fluidized bed having means for providing an inert atmosphere in the material contacting zone.

In a preferred embodiment, because the sulfur coating has low water solubility, the rapidity of nutrient release to the soil is enhanced by incorporating into the sulfur a minor amount of a modifying material which enhances the water permeability of the composite particle.

The preferred process of this invention comprises fluidizing the base solid particulate phosphate fertilizer material and contacting the fluidized base material in the fluidized bed with a molten material comprising elemental sulfur, in such a manner that the molten sulfur impinges upon the fluidized base material and solidifies thereon forming a coating which tends to be a discontinuous coating.

Preferably, the molten material which comprises sulfur is delivered to the fluidized bed in the form of a spray, at a point within the fluidized bed, such as a spray head delivering molten material directly to the fluidized bed. If desired, multiple delivery means may be employed and, if desired, these multiple delivery means may be placed in various positions in relationship to the fluidized bed.

Where the above described process is conducted in a manner so that an inert atmosphere is provided in the contacting and recovery zones, the process of the invention is capable of producing composite fertilizers which are related to products which were heretofore produced under somewhat hazardous conditions by other processes.

So long as an inert atmosphere is provided in the appropriate process zone, its manner of introduction is not critical. The most convenient method of providing an inert atmosphere in the process of the invention is to employ the gas intended to provide this atmosphere as the gas utilized to fluidize the solid base material. In such a process, the gas passing through the fluidized bed is capable of producing an inert atmosphere under positive pressure to the zone above the fluidized bed as well as to any subsequent process zone.

The gas employed may be any gas inert with respect to the solid base material and molten coating material under the process conditions. Typical economical gases include nitrogen and carbon dioxide or other industrially derived gaseous stream containing insufficient oxygen or other gas reactive with the solid base material and molten coating material.

In order to conserve the inert gas, it is desirable to collect the inert gas at some point in the process stream after it has left the fluidized bed, for example, overhead from a fluidized bed processor, and recycle it through a fluidizing blower to maintain the fluidized bed. It is usually desirable to pass the inert gas through one or more dust collection means such as a cyclone collector or other known dust collecting means to achieve fluidization. In such a system the particles tend to segregate as to size and mass, the larger, heavier particles tending to stratify toward the bottom of the fluidized bed. In a continuous process such a relatively non-homogeneous fluidized bed facilitates withdrawing coated materials which have increased in size and mass. Such a system is described in U.S. Pat. No. 2,586,818.

Where the velocity of the gas in the fluidized bed is just below the velocity which would disrupt and disperse the fluidized bed, the character of the fluidized bed tends to be homogeneous, especially where there is not too great a disparity between the size and mass of the particles in the bed. In a continuous process employing such a bed, the mean residence time governs the amount of coating provided on any particle and subsequent classification may be employed to recycle inadequately treated particles. Either homogeneous or non-homogeneous fluidized beds may be utilized in the process of this invention. However, the fluidized bed employed in the coating process is a uniform fluidized bed, that is the fluidizing gas is equally distributed over the cross section of the bed, as opposed to the so called spouting fluidized beds which have rising and falling currents with the bed.

As previously stated, the composite fertilizers of this invention are formed by coating a solid particulate material with a molten material. While the preferred method of coating is in a fluidized bed as described herein, other methods such as a rotating drum coater can be employed. It is only necessary that the coating process be conducted in a manner such that the molten coating material comprising sulfur is deposited on and adheres to the core material under conditions such that the coating has insufficient flow to form a continuous uniform coating, thereby providing discontinuities, cracks, or thin portions which allow hydrolytic attack.

Preferably the molten coating material is rendered particulate in a manner such that the particles have a mean size approximately one-third the mean size of the core particles. Coatings useful for the purposes of this invention can be achieved, for example by maintaining the molten coating material comprising sulfur, at the point of dispensing, at a temperature between about 248° F to about 320° F, while maintaining the temperature of the atmosphere in the coating process and the temperature of the core particles between about ambient temperatures and about 240° F. Obviously the atmosphere in the coating zone and the core particles need not necessarily be the same. For example, either or both the atmosphere or the core particle may be independently heated prior to their introduction into the coating zone.

The fertilizer utilized to form the core of the final composite particle or pellet may be of any solid calcium or ammonium phosphate fertilizer which remains solid at the temperature of the fluidized bed employed in the process of the instant invention. Examples of such fertilizers include, but are not limited to, normal superphosphate, enriched superphosphate, triple superphosphate, monocalcium phosphate, monoammonium phosphate, diammonium phosphate and ammonium polyphosphate, as well as mixtures of various fertilizers such as those set forth above with each other and/or together with inert filler or adjuvant materials having no nutrient value.

Typically, the size of the solid particle core material is between about 6 and about 35 Tyler mesh and preferably between about 7 and 20 Tyler mesh, and preferably the core material remains a solid at temperatures up to about 300° F. The conditions in the coating zone are maintained such that the core material is solid when coated.

The molten sulfur comprises the principle and essential portion of the coating material. Sulfur is amenable as a molten coating material since it solidifies or crystallizes exothermally and does not require the addition of heat to the process system to effect solidification. If necessary, a heat exchanger may be employed in the fluidized bed to remove excess heat. When up to about 30 percent by weight of sulfur is added to a fluidized bed to form a composite with triple superphosphate no heat exchange was required; when amounts of sulfur substantially in excess of 30 percent by weight of sulfur were added to the fluidized bed, a heat exchanger was necessary to maintain the desired process temperature.

Since the molten coating material comprising sulfur, when solidified, has relatively low water solubility, and a relatively continuous layer of coating material on the composite fertilizer particle undesirably retards the release of the base or core material when utilized as a fertilizer, there may be added to the molten sulfur, prior to its use in the coating process, a minor amount of a particulate modifier, which remains at least in part particulate in the molten coating material, and which is more hydrophilic than, or which has a higher water solubility than the molten coating material when solidified, or which swells upon contact with water. This suspension of modifier in the molten sulfur coating material is utilized as a coating material in the process of the invention and results in a composite particle having a core material and a coating thereon, the coating comprising a major amount of the solidified molten coating material having dispersed throughout a minor amount of particulate modifier material having greater water solubility and/or which is more hydrophilic than the solidified molten coating material.

The modifier material which is added preferably has swelling properties in the presence of water, such as clays of the monotmorillonite family, for example, Wyoming type bentonite, or higher water solubility than the coating material; so that when the composite particle is contacted with water, a more rapid physical breakdown of the coating on the composite particle occurs.

For example, where the solid base material is particulate triple superphosphate and the molten coating material is sulfur it is frequently desirable to add between about 5 percent and about 15 percent of pulverized triple superphosphate to the elemental sulfur.

The amount of modifier which may be added to the molten coating material prior to coating the base material in the fluidized bed is not unduly critical. The amount added, however, should not be sufficient to adversely affect the solidification properties of the molten coating material when contacted with the base material, and when it is employed as a suspended solid, should be utilized in amounts so that the mixture may be delivered to the contacting zone as a free flowing fluid, for example, by spraying.

Examples of materials which can be utilized as modifier materials include phosphogypsum, especially in a dehydrated form, e.g., the hemihydrate or anhydrite, calcium sulfate (gypsum, hemihydrate or anhydrite), normal superphosphate, enriched superphosphate, triple superphosphate, urea, potassium phosphate, potassium chloride, monoammonium phosphate, diammonium phosphate, ammonium polyphosphate, potassium sulfate, soluble salts of copper, zinc, manganese, borax, iron, molybdenum and cobalt, water swelling clays such as bentonite, etc., as well as mixtures of those set forth about with other and/or together with fillers or other adjuvant materials.

In a similar manner there may be added to the molten coating material minor amounts of other materials which may be suspended or dissolved in the molten material to serve as additional nutrients or to modify the properties of the molten material either in the process or in its use as a fertilizer. The amount or composition of the material should not be of a nature so that it adversely affects the ability of the molten coating to function in the process of the invention.

For a more complete understanding of the process of the invention, attention is drawn to the drawing which is a schematic representation of an embodiment of the process and the apparatus employed therein. The drawing is schematic in nature and not all hardware and means for achieving the result are depicted, since these are within the skill of the art. It is understood that the drawing is illustrative only and not limiting, for obvious changes in arrangement, construction and operation can be made without departing from the invention.

The apparatus contains a large vertical vessel or chamber 1 for housing a bed of fluidized particles. Hereafter, this unit will be referred to as the chamber. In the chamber a fluidized bed of particulate base material 2, comprising a relatively dense fluid particulate mass, having a surface 10, is maintained by passing a stream of gas, 3, under pressure through a horizontal gas distributing means 4. The gas stream is provided by a gas source 6 through valve 7, the gas being passed through an optional heat exchanger 8, and line 9 to a blower 5 which supplies sufficient gas under sufficient velocity to maintain the fluidized bed 2.

The off gases leaving the chamber pass through a dust collector 20 and through line 21 where they are directed by valve 22 proportionally or intermittently either out of the system through line 23 or to the blower 5 through line 21 to a heat exchanger 8 and line 9.

The molten coating material is supplied to the system from a storage container 11 through appropriate feed means 12 to a heater 13, where it is melted. Modifier material may be added to the molten coating material from storage container 16 through control means 17 into the heater 13, or optionally line 18. Inert gas or other gas or hydraulic pressure as a driving means for the coating material is supplied, for example, by gas source 14 through valve 15. The molten coating material is then passed through line 18 to spray head 19 where it is sprayed in such a manner that the spray contacts the particles of base material in the fluidized bed and solidifies on the surface thereof. While in the drawing the spray head extends into the fluidized bed, in a preferred embodiment the spray head is flush to the wall of the chamber.

For the case where inert gas is introduced into the fluidized bed while serving as the driving force for spraying the molten coating material, that is, the case of a two-fluid atomizing nozzle spray arrangement, and where the fluidizing gas is largely recycled through line 21a, the inert gas introduced through valve 15 in the process of spraying the molten material can serve to partially or completely replace the makeup gas otherwise introduced through line 6.

In a batch process, a quantity of base material is fluidized and contacted with a predetermined amount of molten coating material.

In a continuous method, an ever changing fluidized bed is created by charging solid particulate base material from a container 24 through control means 25 and conduit 26 into the chamber 1. The location of the conduit and the control and conveyance means are dependent at least in part on the nature of the solid particulate base material and the process parameters. An equivalent amount of coated product is withdrawn through conduit 27 and control means 28. The mean residence time determines the nature and thickness of the coating on the resultant composite particle. The location of the withdrawal conduit 27 is dependent at least in part upon the nature of the specific materials employed as well as the process parameters.

It may be desirable, especially where the molten coating material liberates substantial quantities of heat upon solidification, to have present in the chamber in the area of the fluidized bed 2, a heat exchanger 29, for example, with inlet 30 and outlet 31 which provides a heat exchange fluid in order to maintain desirable temperature conditions within the fluidized bed.

It is preferred, especially where inert gas is employed, that static superatmospheric pressure be maintained throughout the entire apparatus to eliminate leakage of air into the apparatus.

The following examples set forth specific embodiments of the instant invention. However, the invention is not to be construed as being limited to these embodiments, for there are, of course, numerous possible variations and modifications. All parts and percentages in the examples as well as throughout the specifications are parts and percentages by weight unless otherwise specified.

EXAMPLE I

Pelletized triple superphosphate fertilizer at a temperature of about 70° F. having a particle size distribution between −8 and +28 Tyler mesh were delivered into a fluid bed processor and fluidized by nitrogen gas at the rate of 140 SCFM per square foot of bed area, maintaining the fluidizing gas temperature at a value to maintain the operating temperature of the fluidized bed between about 110°–170° F.

A molten elemental sulfur slurry, containing 7% bentonite clay and 2% −60 mesh (Tyler) triple superphosphate as modifiers at a temperature of about 270° F., was sprayed into the fluidized bed processor so that the droplets of molten sulfur modifier slurry impinged upon the fluidized particles of phosphate forming a coating thereon, slightly increasing their diameter. Sufficient sulfur was added to prepare a 0-35-0-20 fertilizer (% N-% available $P_2O_5$-%$K_2O$-%S). The product recovered had the following properties:

| Fraction Tyler Mesh | Percent By Weight |
| --- | --- |
| +7 | 6.5 |
| −7/+14 | 82.8 |
| −14 | 10.7 |

EXAMPLE II

In a manner as in Example I sufficient molten sulfur (without modifiers) was added to form a 0-29-0-40 fertilizer. The product recovered had the following properties:

| Fraction Tyler Mesh | Percent By Weight |
| --- | --- |
| +7 | 2.0 |
| −7/+14 | 86.5 |
| −14 | 11.5 |

EXAMPLE III

In a manner as in Example I, a molten elemental sulfur slurry, containing 15%-100 mesh (Tyler) triple superphosphate modifier was used to prepare a 0-35-0-20 fertilizer. The fluidizing gas velocity was 160 SCFM per square foot of fluidized bed area (horizontal cross-section) as described above. Varying fluidized beds of solid base materials and molten coating materials and the like may be employed in a manner such as described above to obtain products within the scope of this invention.

According to the provisions of the patent statutes, there are described above the invention and what are now considered its best embodiments; however, within the scope of the appended claims it is to be understood that the invention can be practiced otherwise than specifically described.

What is claimed is:

1. A composite fertilizer particle having a fertilizer particle core selected from the group consisting of normal superphosphate, enriched superphosphate, triple superphosphate, monocalcium phosphate, monoammonium phosphate, diammonium phosphate, and ammonium polyphosphate and a non-uniform, discontinuous particulate water-permeable coating comprising sulfur.

2. A composite fertilizer particle, as in claim 1, wherein said core is triple superphosphate.

3. A composite fertilizer particle, as in claim 1, which contains about 10% to about 40% sulfur.

4. A composite fertilizer particle comprising a core comprising a calcium or ammonium phosphate fertilizer having a non-uniform water-permeable coating of sulfur, said coating having dispersed therein a minor amount of a particulate modifier material which swells in the presence of water, or which is more water soluble than sulfur, said amount being sufficient to promote the release of the core fertilizer.

5. A composite fertilizer particle, as in claim 4, where said modifier material comprises essentially the same material as the core.

6. A composite fertilizer particle, as in claim 4, where said modifier material comprises a water-swellable clay.

7. A composite fertilizer particle, as in claim 4, where said modifier material comprises triple superphosphate.

8. A composite fertilizer particle, as in claim 4, where the core comprises triple superphosphate and the coating comprises sulfur having dispersed therein, in an amount sufficient to advance the disintegration of the coating, a modifier material selected from the group consisting of triple superphosphate, bentonite, dehydrated phosphogypsum and ammonium sulfate.

9. A composite fertilizer particle, as in claim 8, wherein the composite particle contains about 10% to about 40% by weight of sulfur and the modifier comprises singly or in admixture up to about 20% by weight of the coating of triple superphosphate and up to 10% by weight of the coating of bentonite.

10. A method of forming a composite fertilizer particle comprising a core of a calcium or ammonium phosphate having a non-uniform, discontinuous water permeable coating comprising sulfur which method comprises:

contacting a particulate calcium or ammonium phosphate fertilizer particle with a particulate molten coating material comprising sulfur at a temperature such that the molten coating material does not flow on the surface of the core so as to form a non-uniform water-permeable coating.

* * * * *